United States Patent
Shimizu et al.

(10) Patent No.: US 10,406,935 B2
(45) Date of Patent: Sep. 10, 2019

(54) TRAVEL DRIVING APPARATUS OF VEHICLE

(71) Applicant: MITSUBISHI JIDOSHA KOGYO KABUSHIKI KAISHA, Tokyo (JP)

(72) Inventors: Ryo Shimizu, Tokyo (JP); Norihiko Ikoma, Tokyo (JP); Makoto Kamachi, Tokyo (JP); Hironori Abe, Tokyo (JP); Naoki Miyamoto, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 57 days.

(21) Appl. No.: 15/472,398

(22) Filed: Mar. 29, 2017

(65) Prior Publication Data

US 2017/0282750 A1   Oct. 5, 2017

(30) Foreign Application Priority Data

Mar. 30, 2016 (JP) .................... 2016-068413

(51) Int. Cl.
*B60L 15/00* (2006.01)
*B60K 6/26* (2007.10)
(Continued)

(52) U.S. Cl.
CPC .............. *B60L 15/007* (2013.01); *B60K 1/00* (2013.01); *B60K 1/02* (2013.01); *B60K 6/26* (2013.01);
(Continued)

(58) Field of Classification Search
CPC ........ B60L 15/007; B60L 11/123; B60K 1/00; B60K 1/02; B60K 6/26; B60K 6/442;
(Continued)

(56) References Cited

U.S. PATENT DOCUMENTS

| 6,059,064 | A | * | 5/2000 | Nagano | ................... | B60K 6/44 |
| | | | | | | 180/243 |
| 6,349,782 | B1 | * | 2/2002 | Sekiya | ................... | B60K 6/48 |
| | | | | | | 180/65.25 |

(Continued)

FOREIGN PATENT DOCUMENTS

| EP | 2 025 570 A1 | 2/2009 |
| JP | 2007-325352 A | 12/2007 |

(Continued)

OTHER PUBLICATIONS

Extended European Search Report dated Aug. 11, 2017 issued in the corresponding EP Application No. 17 16 3706.

(Continued)

*Primary Examiner* — Kevin Hurley
*Assistant Examiner* — Michael R Stabley
(74) *Attorney, Agent, or Firm* — Birch, Stewart, Kolasch & Birch, LLP

(57) ABSTRACT

In a hybrid vehicle including a front motor for driving front wheels, a rear motor for driving rear wheels, a generator for generating power by being driven by an internal combustion engine, and a step-up converter for stepping up the voltage from a battery and supplying power to the front motor, while stepping-down the generated power of the generator and supplying the power to the rear motor, a hybrid control unit decreases the power supplied from the generator to the rear motor, and increases the power supplied from the battery to the rear motor when input power of the step-up converter is limited based on a temperature condition of the step-up converter.

2 Claims, 4 Drawing Sheets

(51) Int. Cl.
| | |
|---|---|
| B60K 6/442 | (2007.10) |
| B60K 6/52 | (2007.10) |
| B60K 17/354 | (2006.01) |
| B60K 17/356 | (2006.01) |
| B60K 1/00 | (2006.01) |
| B60K 1/02 | (2006.01) |
| B60K 6/448 | (2007.10) |
| B60W 50/029 | (2012.01) |
| B60W 10/02 | (2006.01) |
| B60W 10/06 | (2006.01) |
| B60W 10/08 | (2006.01) |
| B60W 20/50 | (2016.01) |
| B60L 50/61 | (2019.01) |
| B60W 50/038 | (2012.01) |

(52) U.S. Cl.
CPC .............. *B60K 6/442* (2013.01); *B60K 6/448* (2013.01); *B60K 6/52* (2013.01); *B60K 17/354* (2013.01); *B60K 17/356* (2013.01); *B60L 50/61* (2019.02); *B60W 10/02* (2013.01); *B60W 10/06* (2013.01); *B60W 10/08* (2013.01); *B60W 20/50* (2013.01); *B60W 50/029* (2013.01); *B60K 2001/001* (2013.01); *B60L 2210/14* (2013.01); *B60L 2240/525* (2013.01); *B60L 2260/28* (2013.01); *B60W 50/038* (2013.01); *B60W 2050/0295* (2013.01); *B60W 2710/083* (2013.01); *B60W 2710/086* (2013.01); *B60W 2720/403* (2013.01); *Y02T 10/6217* (2013.01); *Y02T 10/6234* (2013.01); *Y02T 10/6243* (2013.01); *Y02T 10/6265* (2013.01); *Y02T 10/6286* (2013.01); *Y02T 10/645* (2013.01); *Y02T 10/7005* (2013.01); *Y02T 10/7077* (2013.01); *Y02T 10/7225* (2013.01); *Y02T 10/7258* (2013.01); *Y10S 903/906* (2013.01); *Y10S 903/916* (2013.01)

(58) Field of Classification Search
CPC ........ B60K 6/448; B60K 6/52; B60K 17/354; B60K 17/356; B60W 10/02; B60W 10/06; B60W 10/08
See application file for complete search history.

(56) References Cited

U.S. PATENT DOCUMENTS

| | | | |
|---|---|---|---|
| 7,591,339 B2 * | 9/2009 | Sugimoto | B60W 20/13 180/242 |
| 8,177,007 B2 * | 5/2012 | Abe | B60K 1/02 180/65.265 |
| 8,205,697 B2 * | 6/2012 | Delisle | B60K 6/48 180/65.265 |
| 9,156,350 B2 * | 10/2015 | Yasuda | B60K 17/356 |
| 9,290,169 B2 * | 3/2016 | Saito | B60K 6/445 |
| 2003/0060948 A1 * | 3/2003 | Yamaguchi | B60K 6/383 701/22 |
| 2004/0135527 A1 * | 7/2004 | Tatara | B60K 6/442 318/139 |
| 2006/0196714 A1 | 9/2006 | Sugimoto et al. | |

FOREIGN PATENT DOCUMENTS

| | | | |
|---|---|---|---|
| JP | 2014-125053 A | 2/2009 | |
| JP | 2014 125053 | * 7/2014 | ............ B60W 10/08 |

OTHER PUBLICATIONS

Chinese Office Action and Search Report, dated Nov. 30, 2018, for Chinese Application No. 201710201553.7, along with an English Translation.

* cited by examiner

0
TRAVEL DRIVING APPARATUS OF VEHICLE

BACKGROUND OF THE INVENTION

Field of the Invention

The present invention relates to control of travel driving of a vehicle.

Description of the Related Art

In hybrid vehicles which have been developed recently, there is known a vehicle which is operable in a travelling mode in which driving wheels for travelling are driven by an electric motor while power is generated by a generator driven by an internal combustion engine (series mode).

Further, there is also proposed a vehicle including a transformer for stepping up voltage, in which voltage outputted from an onboard battery is stepped up by the transformer to drive an electric motor.

For example, Japanese Patent Laid-Open No. 2007-325352 discloses a vehicle including an electrically powered front motor for driving the front wheels and an electrically powered rear motor for driving the rear wheels. In the vehicle of Patent Document 1, the front motor is driven by voltage which is outputted from an on-board battery and stepped up by a transformer. Moreover, power generated by the generator can be supplied to the front motor. Further, by stepping down the voltage of the power generated by the generator with a transformer, it becomes possible to supply power to the rear motor and charge the battery.

Meanwhile, there are upper limits for input and output power for the transformer as described above for protecting components from generated heat or the like. Therefore, in a vehicle which is driven to travel by a rear motor supplied with part of the power generated by the generator as described above and stepped down by the transformer in a series mode, there is possibility that power inputted from the generator to the transformer exceeds an upper limit value when travel driving torque of the vehicle increases.

SUMMARY OF THE INVENTION

Accordingly, it is an objective of the present invention to provide a travel driving apparatus of a vehicle, which satisfies a required torque requested by the driver while protecting a transformer in a hybrid vehicle equipped with a transformer.

In order to achieve the above described objective, the travel driving apparatus of a vehicle of the present invention includes: a first electrical motor for driving either one of front and rear wheels of the vehicle; a generator for generating power by being driven by an internal combustion engine mounted on the vehicle; a transformer for transforming power from a battery mounted on the vehicle and supplying the power to the first electrical motor, while transforming generated power of the generator and supplying the power to the battery, wherein maximum output power is limited based on a temperature condition; a second electrical motor which is supplied with power of the battery not via the transformer while being supplied with power of the generator via the transformer, and drives the other one of the front and rear wheels; and power distribution means for distributing power supplied from the battery and power generated at the generator to the first electrical motor and the second electrical motor when the transformer is not limited, and decreases the power supplied from the generator to the second electrical motor and increases the power supplied from the battery to the second electrical motor when the transformer is limited.

As a result of this, the travel driving apparatus of a vehicle of the present invention can satisfy a required driving force while protecting the transformer when the transformer is limited during power generation operation by the generator.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, embodiments of the present invention will be described with reference to the drawings.

Figure 1:
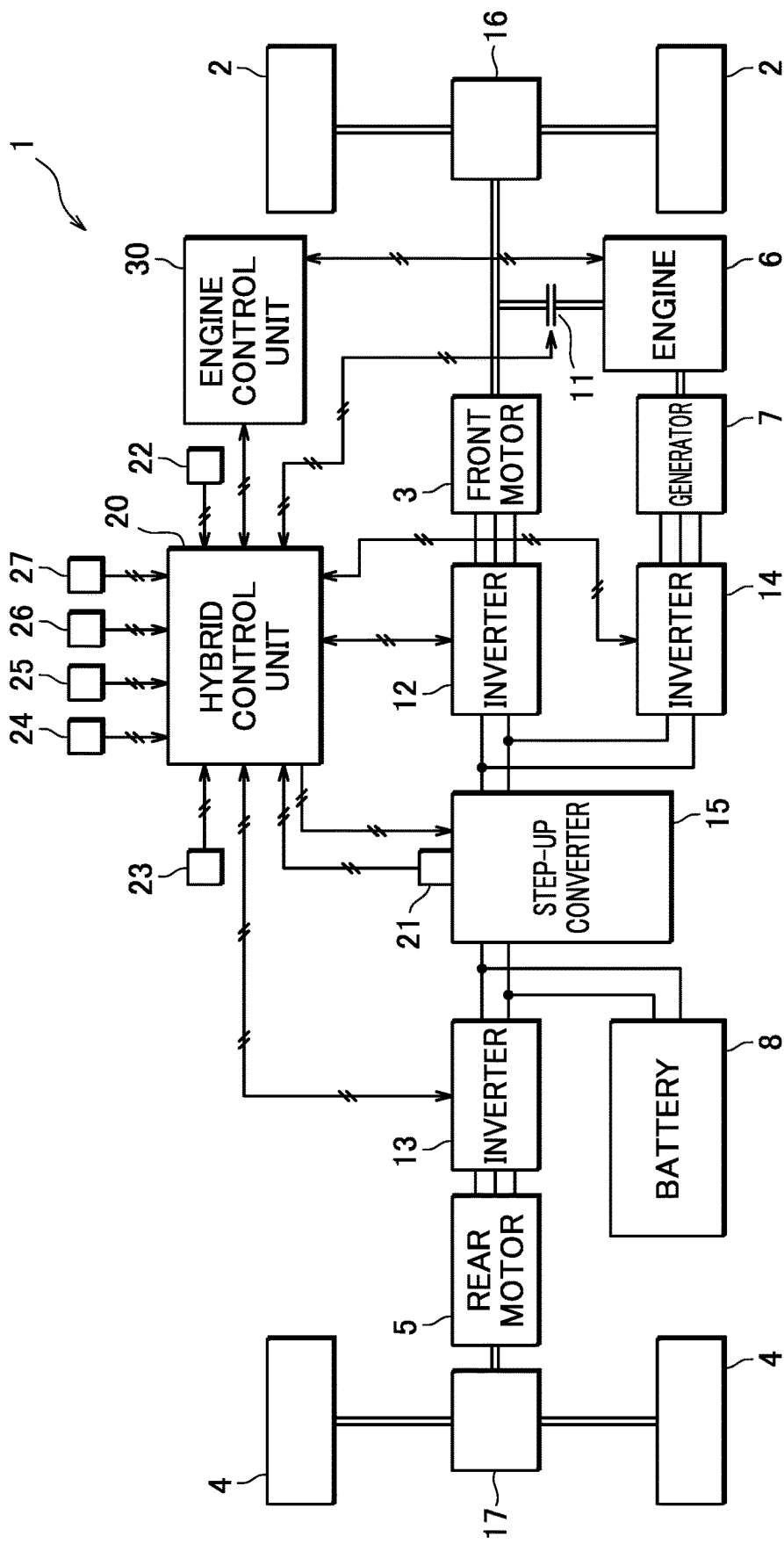
FIG. 1 is a schematic configuration diagram of a travel driving apparatus of a vehicle according to one embodiment of the present invention.

FIG. 1 is a schematic configuration diagram of a travel driving apparatus 1 of a vehicle according to one embodiment of the present invention.

As shown in FIG. 1, a vehicle equipped with a travel driving apparatus 1 of one embodiment of the present invention is a four-wheel drive hybrid vehicle, which is provided with an electrically driven front motor 3 (first electrical motor) for driving front wheels 2 (first travel driving wheels), an electrically driven rear motor 5 (second electrical motor) for driving rear wheels 4 (second travel driving wheels), an engine 6 (internal combustion engine), a generator 7, and a battery 8.

The engine 6 can drive the front wheels 2 via a front trans-axle 16 and drive the generator 7 to generate power. Moreover, the engine 6 and the front wheels 2 are connected such that power can be transferred therebetween via a clutch 11.

Moreover, the vehicle is provided with an inverter 12 for controlling power supply to the front motor 3, an inverter 13 for controlling power supply to the rear motor 5, and an inverter 14 for controlling output of the generator 7.

The present embodiment includes a step-up converter 15 (transformer) which steps up the voltage of the battery 8 and supplies high voltage power to the front motor 3, and at the same time steps down the high voltage power generated by the generator 7 to supply it to the battery 8 or the rear motor 5.

The front motor 3, which can be driven by being supplied with power from the battery 8 via the step-up converter 15 and the inverter 12, and also can be driven by being supplied with power from the generator 7 via the inverter 14 and the inverter 12, drives the front wheels 2 via the front trans-axle 16.

The rear motor 5, which can be driven by being supplied with power from the battery 8 via the inverter 13, and also by being supplied with power from the generator 7 via the inverter 14, the step-up converter 15, and the inverter 13, drives the rear wheels 4 via a rear trans-axle 17.

The power generated by the generator 7 and outputted from the inverter 14 allows charging of the battery 8 via the step-up converter 15, and can also be supplied to the front motor 3 via the inverter 12 and to the rear motor 5 via the step-up converter 15 and the inverter 13.

Moreover, the generator 7, which is driven by being supplied with power from the battery 8 via the step-up converter 15 and the inverter 14, has a function as a starter motor for starting the engine 6.

The battery 8, which is made up of a secondary cell battery such as a lithium-ion battery, has a battery module not shown and made up of a plurality of battery cells brought together.

Operation of each of the inverter 12, the inverter 13, the inverter 14, and the step-up converter 15 is controlled by a control signal from a hybrid control unit 20 mounted on the vehicle. The hybrid control unit 20 includes power distribution means for distributing power supplied from the battery and power generated at the generator to the front motor and the rear motor.

The step-up converter 15 is provided with a temperature sensor 21 for detecting the temperature of a component (element, etc.) of the step-up converter 15.

Further, the vehicle is provided with a front-wheel rotational frequency sensor 22 for detecting the number of rotation per unit time of the front wheel 2, a rear-wheel rotational frequency sensor 23 for detecting the number of rotation per unit time of the rear wheel 4, an accelerator sensor 24 for detecting an accelerator depression amount, a brake sensor 25 for detecting a brake depression amount, a G sensor 26 for detecting longitudinal acceleration and lateral acceleration of the vehicle, a steering angle sensor 27 for detecting a steering control angle, and an engine control unit 30 for controlling the driving of the engine 6.

The engine control unit 30 controls the driving of the engine 6 based on a control signal from the hybrid control unit 20.

The hybrid control unit 20, which is a control apparatus for performing comprehensive control of the vehicle, is configured to include an input/output apparatus, a storage apparatus (ROM, RAM, non-volatile RAM, etc.), a central processing unit (CPU), and a timer, etc.

The input side of the hybrid control unit 20 is connected with each of the inverters 12 to 14, the engine control unit 30, the temperature sensor 21, the front-wheel rotational frequency sensor 22, the rear-wheel rotational frequency sensor 23, the accelerator sensor 24, the brake sensor 25, the G sensor 26, and the steering angle sensor 27, and is inputted with detection and operation information from these equipment.

On the other hand, the output side of the hybrid control unit 20 is connected with each of the inverters 12 to 14, the engine control unit 30, and the clutch 11.

Then, the hybrid control unit 20 transmits a control signal to the engine control unit 30, each of the inverters 13 and 14, and the clutch 11 to control the switching of the travelling mode (EV mode, series mode, and parallel mode) which involves engagement and disengagement of the clutch 11, output torques of the engine 6, the front motor 3 and the rear motor 5, and generated power of the generator 7 based on various detection amounts such as accelerator depression amount from the accelerator sensor 24 of the vehicle, and various operation information.

In the parallel mode, the front wheels 2 are mechanically driven by the output of the engine 6 with the clutch 11 being engaged, and are also driven to travel by the front motor 3 or the rear motor 5.

In the EV mode and the series mode, the clutch 11 is disengaged. In the EV mode, the engine 6 is stopped, and the front motor 3 and the rear motor 5 are driven by power from the battery 8. In the series mode (first travelling mode), the engine 6 is operated to cause the generator 7 to generate power, thereby supplying power to and driving the front motor 3 and the rear motor 5.

Figure 2:
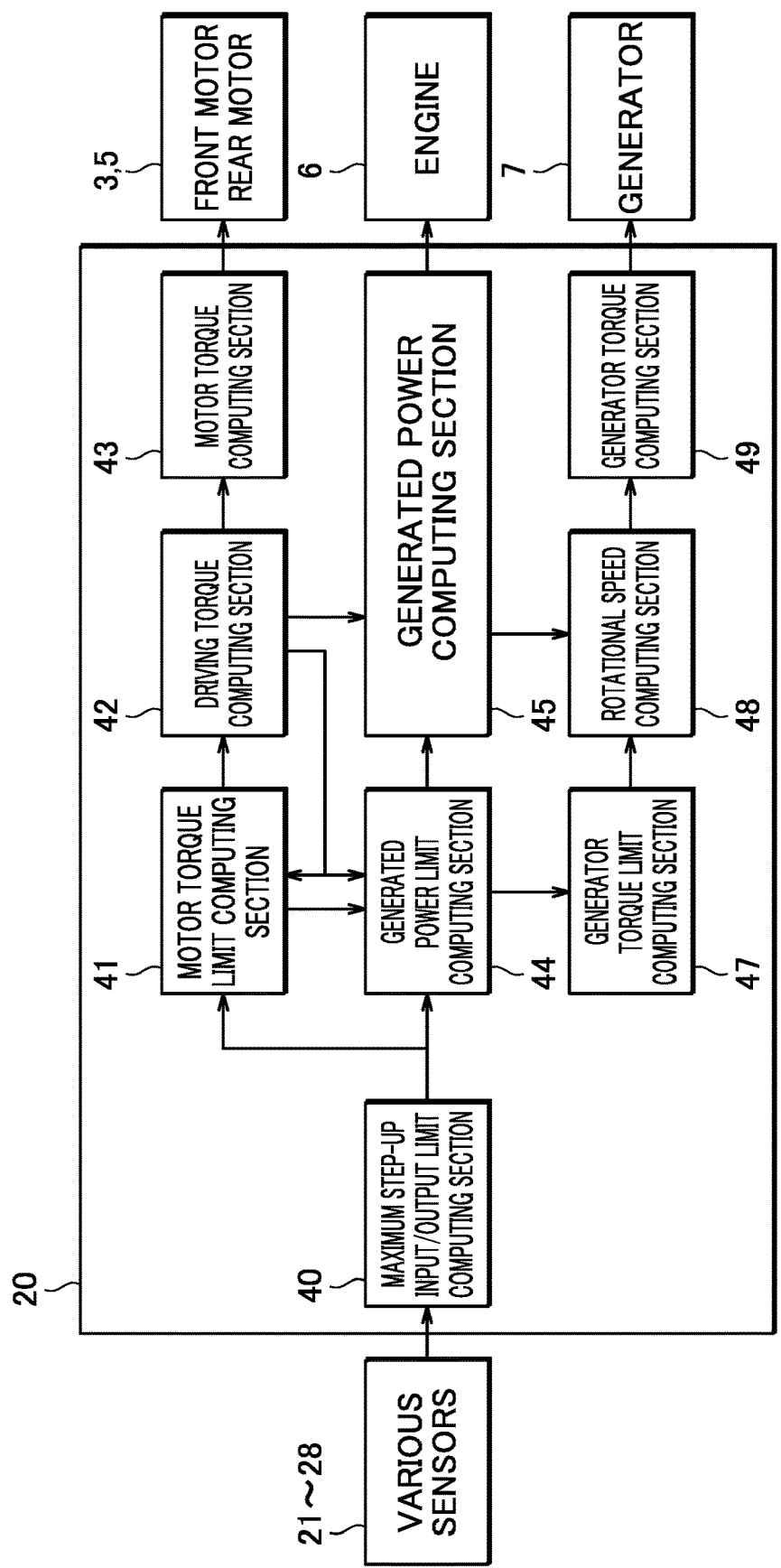
FIG. 2 is a block diagram to show a configuration of a driving control apparatus according to the present embodiment.

FIG. 2 is a block diagram to show the configuration of a driving control apparatus of the present embodiment.

As shown in FIG. 2, the hybrid control unit 20 includes a maximum step-up input/output limit computing section 40, a motor torque limit computing section 41, a driving torque computing section 42, a motor torque computing section 43, a generated power limit computing section 44, a generated power computing section 45, a generator torque limit computing section 47, a rotational speed computing section 48, a generator torque computing section 49, and power distribution means.

The maximum step-up input/output limit computing section 40 computes a step-up converter upper-limit power Pvmax, which is the maximum input/output power of the step-up converter 15, based on the temperature of the step-up converter 15.

The motor torque limit computing section 41 computes upper limit values of the motor torques (driving torques of the front motor 3 and the rear motor 5)(Tfmax, Trmax), respectively.

The driving torque computing section (required driving force calculation means) 42 computes driving torque of the entire vehicle (user-requested driving torque Tur).

The motor torque computing section (distributed driving force setting means) 43 computes motor torques Tmf, Tmr of the front motor 3 and the rear motor 5. Then, based on these motor torques Tmf, Tmr, it controls the operation of the front motor 3 and the rear motor 5 via the inverters 12, 13.

The generated power limit computing section 44 computes a maximum value of the generated power of the generator 7 (generator upper-limit generated power Pgmax).

The generated power computing section 45 computes the generator output Pg, which is generated power by the generator 7, which is required corresponding to the user-requested driving torque Tur. Then, the operation of the engine 6 is controlled via the engine control unit 30 such that generation of the generator output Pg is possible at the generator 7.

The generator torque limit computing section 47 computes a limiting value of the generator torque.

The rotational speed computing section 48 computes a rotational speed of the generator 7 corresponding to the generator output Pg.

The generator torque computing section 49 computes a generator torque for achieving the rotational speed of the generator 7 which is computed at the rotational speed computing section 48. Based on the generator torque, it controls the generator 7 via the inverter 14.

Next, driving control by the travel driving apparatus 1 of the present embodiment will be described in detail by using FIG. 3.

Figure 3:
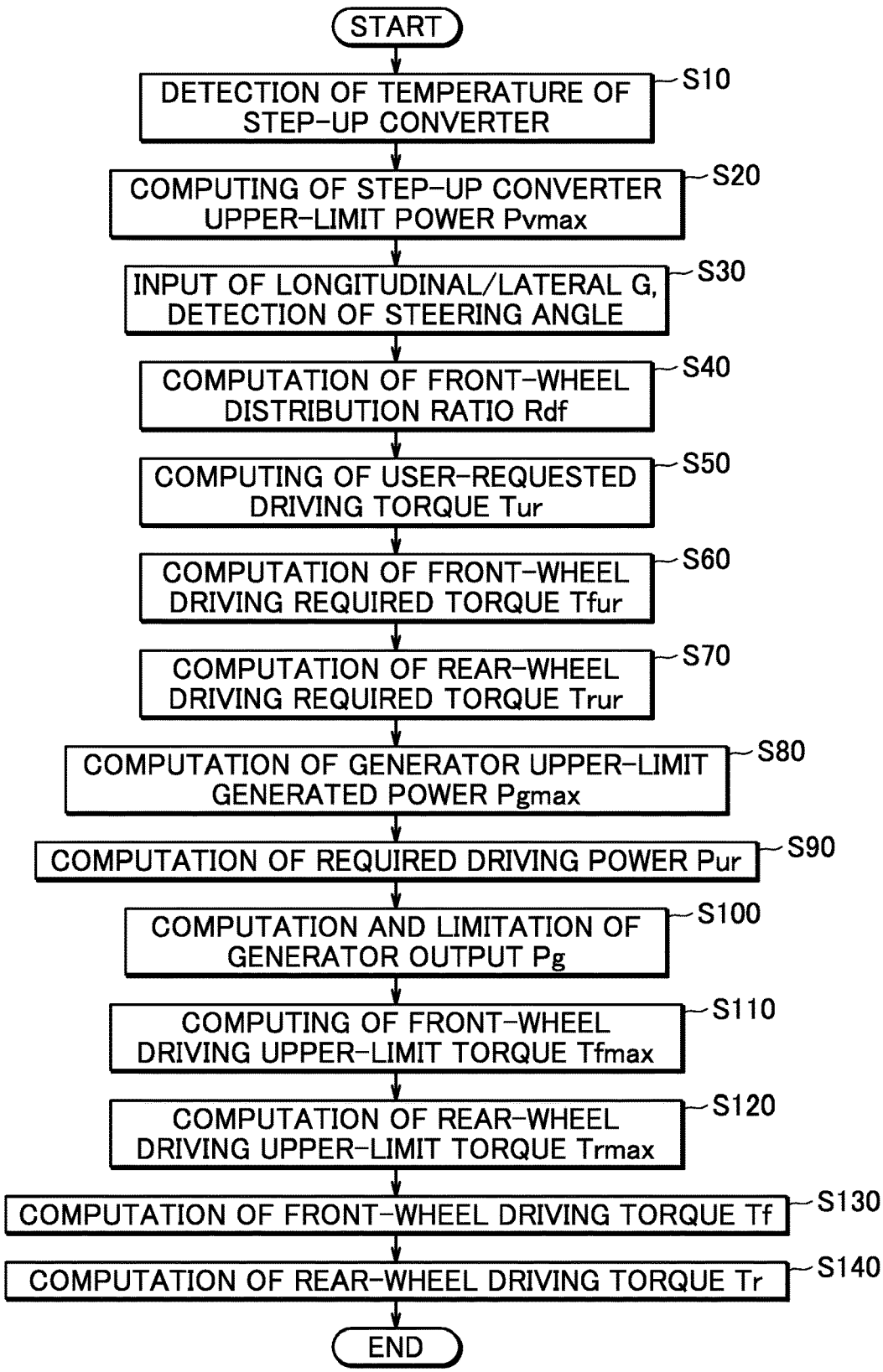
FIG. 3 is a flowchart to show a part of driving control procedure in the travel driving apparatus of the present embodiment.

FIG. 3 is the flowchart to show the driving control procedure in the travel driving apparatus 1.

The hybrid control unit 20 repeatedly executes routines of driving control shown in FIG. 3 in the series mode.

First, in step S10, a temperature of the step-up converter 15 is inputted from the temperature sensor 21. Then the process proceeds to step S20.

In step S20, a step-up converter upper-limit power Pvmax is computed based on the temperature of the step-up converter 15 which has been inputted in step S10. The step-up converter upper-limit power Pvmax is an upper limit value of the power that can be inputted/outputted in the step-up converter 15. The step-up converter upper-limit power Pvmax is computed by using, for example, a pre-stored map, and setting is made such that the step-up converter upper-limit power Pvmax becomes lower as the temperature of the step-up converter 15 becomes higher. The step-up converter upper-limit power Pvmax is set to be, for example, 50% of maximum rating during a normal condition, and the input/output power of the step-up converter is set to be 30 to 50%. Further, during an abnormal condition of the step-up converter 15, the step-up converter upper-limit power Pvmax is set to be 0. Then, the process proceeds to step S30. Note that the control of this step corresponds to the function in the above described maximum step-up input/output limit computing section 40.

In step S30, longitudinal acceleration and lateral acceleration of the vehicle are detected by the G sensor 26. Moreover, the steering angle of the steering wheel is detected by the steering angle sensor 27. Then, these longitudinal acceleration, lateral acceleration, and steering angle are inputted. Then, the process proceeds to step S40.

In step S40, a front-wheel distribution ratio Rdf is computed based on the longitudinal acceleration, lateral acceleration, and steering angle, which are inputted in step S30. For example, when it is judged to be steady travelling based on the lateral acceleration and steering angle, control is performed such that the front-wheel distribution ratio Rdf increases. For example, during other than during a steady operation or straight travelling, or within a predetermined period after the generator is started, the front-wheel distribution ratio Rdf is set to be 50% (0.5), and during a steady operation in straight travelling, etc., the front-wheel distribution ratio Rdf is set to be 90% (0.9). Then, the process proceeds to step S50.

In step S50, a user-requested driving torque Tur is computed based on a vehicle speed V computed based on detection values (Rf, Rr) of the front-wheel rotational frequency sensor 22 and the rear-wheel rotational frequency sensor 23, an accelerator depression amount and a brake depression amount based on detection values of the accelerator sensor 24 and the brake sensor 25. The user-requested driving torque Tur is a travel driving torque of the entire vehicle which is needed when accelerating/decelerating the vehicle from the current vehicle speed V in correspondence with the acceleration/deceleration instruction of the driver based on the acceleration amount and the braking amount. Then, the process proceeds to step S60. Note that the control of this step corresponds to the function of the above described driving torque computing section 42.

In step S60, a front-wheel driving required torque Tfur is computed. The front-wheel driving required torque Tfur, which is a driving required torque of the front wheel 2, is a value obtained by multiplying the user requested driving torque Tur computed in step S50 and the front-wheel distribution ratio Rdf computed in step S40 as shown in Formula (1) below.

$$Tfur = Tur \times Rdf \quad (1)$$

Then, the process proceeds to step S70.

In step S70, a rear-wheel driving required torque Trur is computed. This is a driving required torque at the rear wheel and is a value obtained by subtracting the front-wheel driving required torque Tfur computed in step S60 from the user-requested driving torque Tur computed in step S50 as shown in Formula (2) below.

$$Trur = Tur - Tfur \quad (2)$$

Thereafter, the process proceeds to step S80.

In step S80, a generator upper-limit generated power Pgmax is computed. The generator upper-limit generated power Pgmax, which is a maximum value of generated power by the generator 7 (generator output Pg), is a value obtained by subtracting the step-up converter upper-limit power Pvmax computed in step S20 from the front-wheel driving power Pf as shown by Formula (3) below.

$$Pgmax = (Pf - Pvmax) \quad (3)$$

Note that the front-wheel driving power Pf may be computed based on the front-wheel driving required torque Tfur computed in step S60 and, for example, may be obtained by multiplication of the front-wheel driving required torque Tfur, the front wheel speed Vf, an appropriately set coefficient "a", and an efficiency $\eta mf$ of the front motor 3 as shown in Formula (4) below.

$$Pf = Tur \times Vf \times a/\eta mf \quad (4)$$

Thereafter, the process proceeds to step S90.

In step S90, required driving power Pur is computed. The required driving power Pur, which is a total value of required driving power of the front motor 3 and the rear motor 5, is computed by the front-wheel driving required torque Tfur computed in step S60, the rear-wheel driving required torque Trur computed in step S70, a tire radius r of the vehicle, a vehicle speed V, and efficiency $\eta m$ of the front motor 3 and the rear motor 5 as shown in Formula (5) below.

$$Pur = (Tfur + Trur)/r \times V/3.6 \times \eta m \quad (5)$$

Thereafter, the process proceeds to step S100.

In step S100, generator output Pg is computed. The generator output Pg is supposed to be a lower value between the required driving power Pur computed in step S90 and the generator upper-limit generated power Pgmax computed in step S80 as shown in Formula (6) below.

$$Pg = \min(Pur, Pgmax) \quad (6)$$

Then, the process proceeds to step S110.

In step S110, a front-wheel driving upper-limit torque Tfmax is computed. The front-wheel driving upper-limit torque Tfmax is an upper limit value of the front-wheel driving torque Tf which is limited based on the step-up converter upper-limit power Pvmax in which a generator output amount is taken into consideration. The front-wheel driving upper-limit torque Tfmax is computed from the step-up converter upper-limit power Pvmax computed in step S20, the generator output Pg computed in step S100, efficiency $\eta mf$ of the front motor 3, and a front-wheel rotational frequency Rf detected by the front-wheel rotational frequency sensor 22 as shown in Formula (7) below.

$$Tfmax = (Pvmax + Pg) \times \eta mf/Rf/(2\pi/60) \quad (7)$$

Then, the process proceeds to step S120.

In step S120, a rear-wheel driving upper-limit torque Trmax is computed. A rear-wheel driving upper-limit torque Trmax is computed from the front-wheel driving upper-limit torque Tfmax computed in step S110, and the front-wheel distribution ratio Rdf computed in step S40 as shown in Formula (8) below.

$$Trmax=Tfmax\times(1-Rdf)/Rdf \quad (8)$$

Then, the process proceeds to step S130.

In step S130, front-wheel driving torque Tf is computed. The front-wheel driving torque Tf is supposed to be a smaller value between the front-wheel driving required torque Tfur computed in step S60 and the front-wheel driving upper-limit torque Tfmax computed in step S110 as shown in Formula (9) below.

$$\text{The front-wheel driving torque } Tf=\min(Tfur, Tfmax) \quad (9)$$

Then, the process proceeds to step S140.

In step S140, a rear-wheel driving torque Tr is computed. The rear-wheel driving torque Tr is supposed to be a lower value between the rear-wheel driving required torque Trur computed in step S70 and the rear-wheel driving upper-limit torque Trmax computed in step S120 as shown in Formula (10) below.

$$Tr=\min(Trur, Trmax) \quad (10)$$

Then, this routine is ended.

Through the above described control, the front-wheel driving torque Tf and the rear-wheel driving torque Tr are found. Then, the hybrid control unit 20 controls the output of the front motor 3 based on the front-wheel driving torque Tf and controls the output of the rear motor 5 based on the rear-wheel driving torque Tr. Moreover, the generator output Pg is found and the output of the generator 7 is controlled based on the generator output Pg.

The vehicle of the present embodiment is a four-wheel drive vehicle in which the front wheel 2 can be driven by the front motor 3 and the rear wheel 4 can be driven by the rear motor 5. Further, the vehicle is operable in a series mode in which travel driving is performed by the front motor 3 and the rear motor 5 while the engine 6 is operated to generate power.

The vehicle is mounted with the step-up converter 15 and is configured such that the front motor 3 is supplied with and driven by power which is supplied from the battery 8 and is stepped up in voltage by the step-up converter 15. In the series mode, the power generated by the generator 7 is supplied to the front motor 3 to drive the front wheels 2, and power is supplied from the generator 7 to the rear motor 5 via the step-up converter 15 to drive the rear wheels 4.

Thus, in the present embodiment, temperature of the step-up converter 15 is detected to compute the step-up converter upper-limit power Pvmax, and the generator output Pg, the front-wheel driving torque Tf, and the rear-wheel driving torque Tr are limited based on the step-up converter upper-limit power Pvmax by the driving control shown in FIG. 3 above in the series mode so that the power (Pv) which is supplied from the generator 7 to the rear motor 5 via the step-up converter 15 is controlled so as not to exceed the step-up converter upper-limit power Pvmax.

Figure 4:
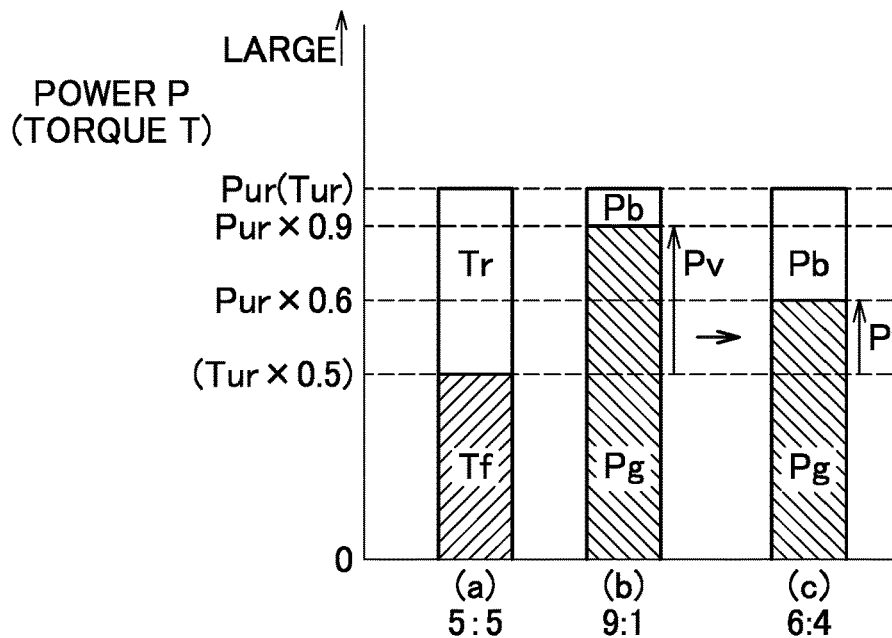
FIG. 4 is a graph to illustrate one example of power distribution state between the front and the rear, and driving torque distribution state between the front and the rear during a steady operation in a series mode.

FIG. 4 is a graph to illustrate one example of power distribution state between the front and the rear, and driving torque distribution state between the front and the rear during a steady operation in the series mode, particularly when the vehicle is turning or accelerating. In FIG. 4, (a) indicates a driving torque distribution state in which the front-rear wheel distribution ratio of driving torque is 5:5 because the vehicle is turning or accelerating. Where, the front-rear wheel distribution ratio will be 9:1 when the vehicle is neither turning nor accelerating/decelerating. Moreover, (b) indicates a power distribution state before limitation of the generator output Pg of the present embodiment is performed, in which the ratio of the generator output Pg to the output Pb from the battery 8 at the required driving power Pur is 9:1. Further, (c) indicates a power distribution state when limitation of the generator output Pg of the present embodiment is performed, in which the distribution ratio (output ratio between the generator 7 and the battery 8) of power is 6:4.

When the front-rear wheel distribution ratio of driving torque while the vehicle is turning or accelerating is 5:5 as shown in (a) of FIG. 4, the required driving power of the rear motor 5 is relatively large. Thus, if it is arranged that the generator output Pg is at maximum and 90% of the required driving power Pur is supplied by the generator output Pg as shown in (b), the power (Pv in FIG. 4) supplied from the generator 7 to the rear motor 5 via the step-up converter 15 exceeds the step-up converter upper-limit power Pvmax.

In the present embodiment, the generator upper-limit generated power Pgmax according to the step-up converter upper-limit power Pvmax is set such that the generator output Pg is limited and the power supplied from the generator 7 to the rear motor 5 via the step-up converter 15 is not more than the step-up converter upper-limit power Pvmax as shown in (c). This makes it possible to protect the step-up converter 15.

Then, as for the reduced amount of the generator output Pg, it is possible to fulfill the required driving power Pur and satisfy the user-requested driving torque Tur by increasing the output from the battery 8.

Further, setting the generator output Pg to be the generator upper-limit generated power Pgmax makes it possible to increase the generator output Pg as much as possible within a range that the input/output power of the step-up converter 15 does not exceed the generator upper-limit generated power Pgmax, and thus increase the output torque of the entire vehicle, particularly of the front motor 3, thereby improving the travelling performance of the vehicle.

Figure 5:
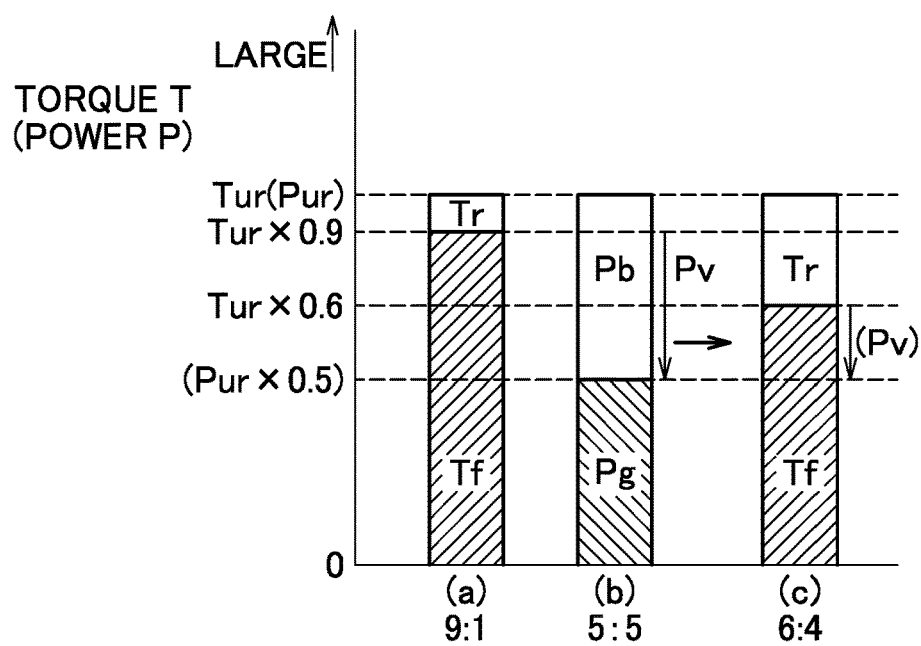
FIG. 5 is a graph to illustrate one example of power distribution state between the front and the rear, and driving torque distribution state between the front and the rear in a situation in which generated power by the generator in the series mode is limited.

Further, FIG. 5 is a graph to illustrate one example of power distribution state between the front and the rear, and driving torque distribution state between the front and the rear in a situation in which generated power by the generator in the series mode is limited, that is, under an environment such as within a predetermined period from the start of the generator, and when atmospheric pressure is low such as at a high altitude. In FIG. 5, (a) indicates a driving torque distribution during a steady operation, that is, in a travelling state in which the vehicle is neither accelerating nor decelerating, in which the front-rear wheel distribution ratio is 9:1. Where, (b) indicates that the distribution ratio between power (output ratio between the generator 7 and the battery 8) becomes 5:5 in a situation in which the generated power by the generator is limited, that is, under an environment such as within a predetermined period from the start of the generator, and when atmospheric pressure is low such as at a high altitude. Further, (c) indicates a driving torque distribution state when the front-wheel driving torque is limited to decrease power passing through the step-up converter, thereby protecting the step-up converter in the situation of (b), in which the front-rear wheel distribution ratio of driving torque is 6:4.

Since the front-rear wheel distribution ratio of driving torque is 9:1 during a steady operation, that is, in a travelling state in which the vehicle is neither accelerating nor decelerating as shown in (a) of FIG. 5, if the vehicle in such a situation is brought into a situation in which generated power by the generator is limited, that is, under an environment such as within a predetermined period from the start of the generator, and when atmospheric pressure is low such as at a high altitude, the required driving power of the front motor 3 is relatively large, and power is supplied from the battery 8, together with the power of the generator 7, to the front motor 3 via the step-up converter 15. In such a case, passing power of the step-up converter 15 will not be reduced even if the generator output Pg is limited.

Accordingly, in the present embodiment, it is possible to reduce the passing power of the step-up converter 15 by limiting the front-wheel driving torque Tf as shown in (c). Note that by increasing the supplied power from the battery 8 to the rear motor 5, thereby increasing the rear-wheel driving torque Tr, it is possible to make up for the reduction amount of the front-wheel driving torque Tf, thereby ensuring the driving torque of the entire vehicle.

Note that although the front-rear wheel distribution ratio (front-wheel distribution ratio Rdf) will be changed as a result of the above described control, if for example the step-up converter 15 fails and the step-up converter upper-limit power Pvmax becomes 0, the front-wheel driving power Pf becomes less than the generator upper-limit generated power Pgmax, and the rear-wheel driving power Pr becomes less than the maximum output power Pbmax of the battery 8 as shown in Formulas (11) and (12) below.

$$Pf < Pgmax \quad (11)$$

$$Pr < Pbmax \quad (12)$$

Further, when the step-up converter upper-limit power Pvmax becomes 0, the front-wheel maximum distribution ratio Rdfmax and the rear-wheel maximum distribution ratio Rdrmax are determined by the generator upper-limit generated power Pgmax and the maximum output power Pbmax of the battery 8 as shown in Formulas (13) and (14) below.

$$Rdfmax = Pgmax/(Pgmax + Pbmax) \quad (13)$$

$$Rdrmax = Pbmax/(Pgmax + Pbmax) \quad (14)$$

Thus, a range of selecting the front-rear wheel distribution ratio (front-wheel distribution ratio Rdf) expands in a state in which the step-up converter upper-limit power Pvmax is larger than 0.

Note that the present invention will not be limited to the above described embodiments. The present invention may be widely applicable to a hybrid vehicle, of which operation can be a series mode, and which is equipped with a step-up converter.

What is claimed is:

1. A travel driving apparatus of a vehicle, comprising:
   a first electrical motor for driving either one of front and rear wheels of the vehicle;
   a generator for generating power by being driven by an internal combustion engine mounted on the vehicle;
   a transformer for transforming power from a battery mounted on the vehicle and supplying the power to the first electrical motor, while transforming generated power of the generator and supplying the power to the battery, wherein maximum output power is limited based on a temperature condition;
   a second electrical motor which is supplied with power of the battery not via the transformer while being supplied with power of the generator via the transformer, and drives the other one of the front and rear wheels;
   a power distributor distributing power supplied from the battery and power generated at the generator to the first electrical motor and the second electrical motor;
   a required driving force calculator calculating required driving force of a vehicle; and
   a distributed driving force setter setting distributed driving force for distributing the required driving force to the first electrical motor and the second electrical motor, wherein
   the power distributor decreases the power supplied from the generator to the second electrical motor and increases the power supplied from the battery to the second electrical motor when the transformer is limited, and
   the distributed driving force setter causes the distributed driving force to be maintained by decreasing the power supplied from the generator to the second electrical motor and increasing the power supplied from the battery to the second electrical motor, with the power distributor, when the transformer is limited.

2. The travel driving apparatus of a vehicle according to claim 1, wherein
   the distributed driving force setter decreases the distributed driving force to be distributed to the first electrical motor and increases the distributed driving force to be distributed to the second electrical motor, when the transformer is limited within a predetermined period after the generator is started or in a case where atmospheric pressure is low at high altitude.

* * * * *